Feb. 13, 1923.
H. G. BIELHEN.
KAFIR CORN HARVESTER.
FILED OCT 29, 1919.
1,445,383.
4 SHEETS—SHEET 1.
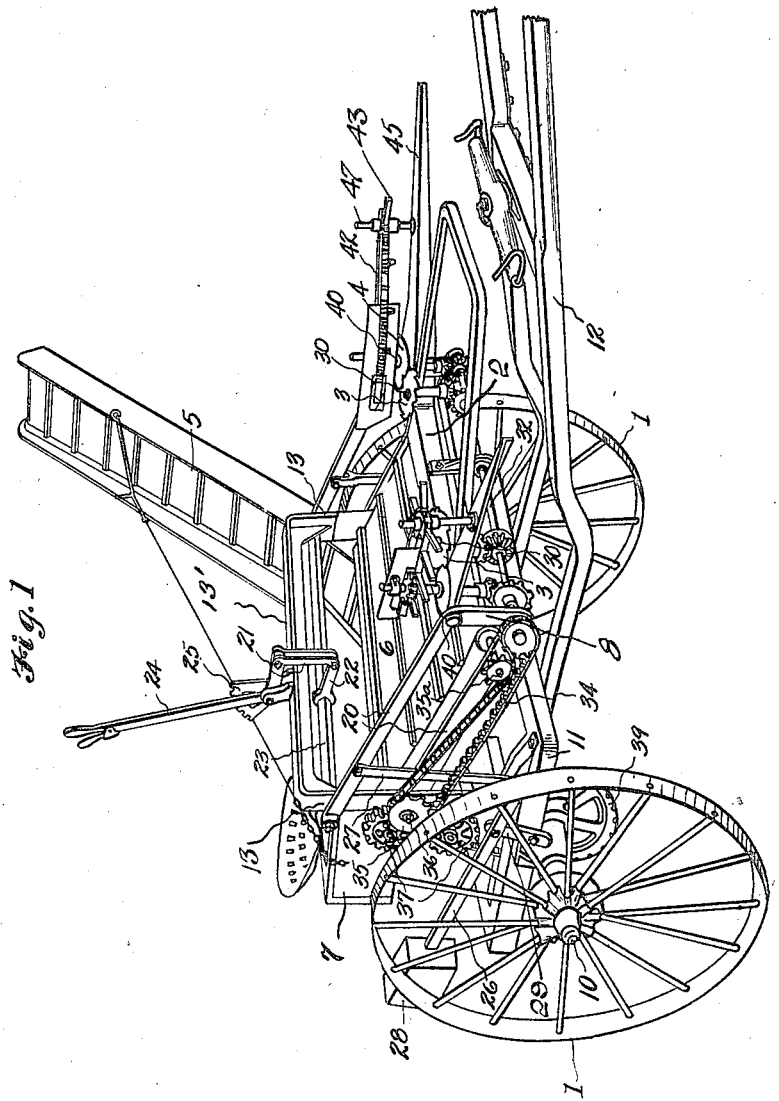
INVENTOR
HENRY G. BIELHEN
BY
*Reynolds & Cook*
ATTORNEY

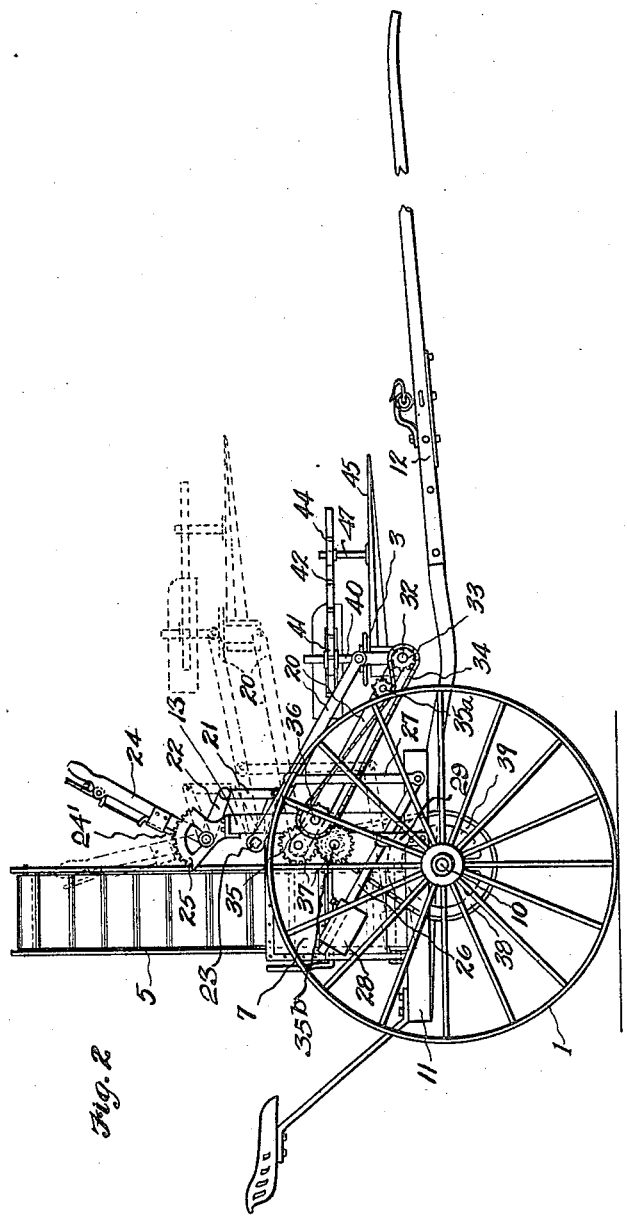

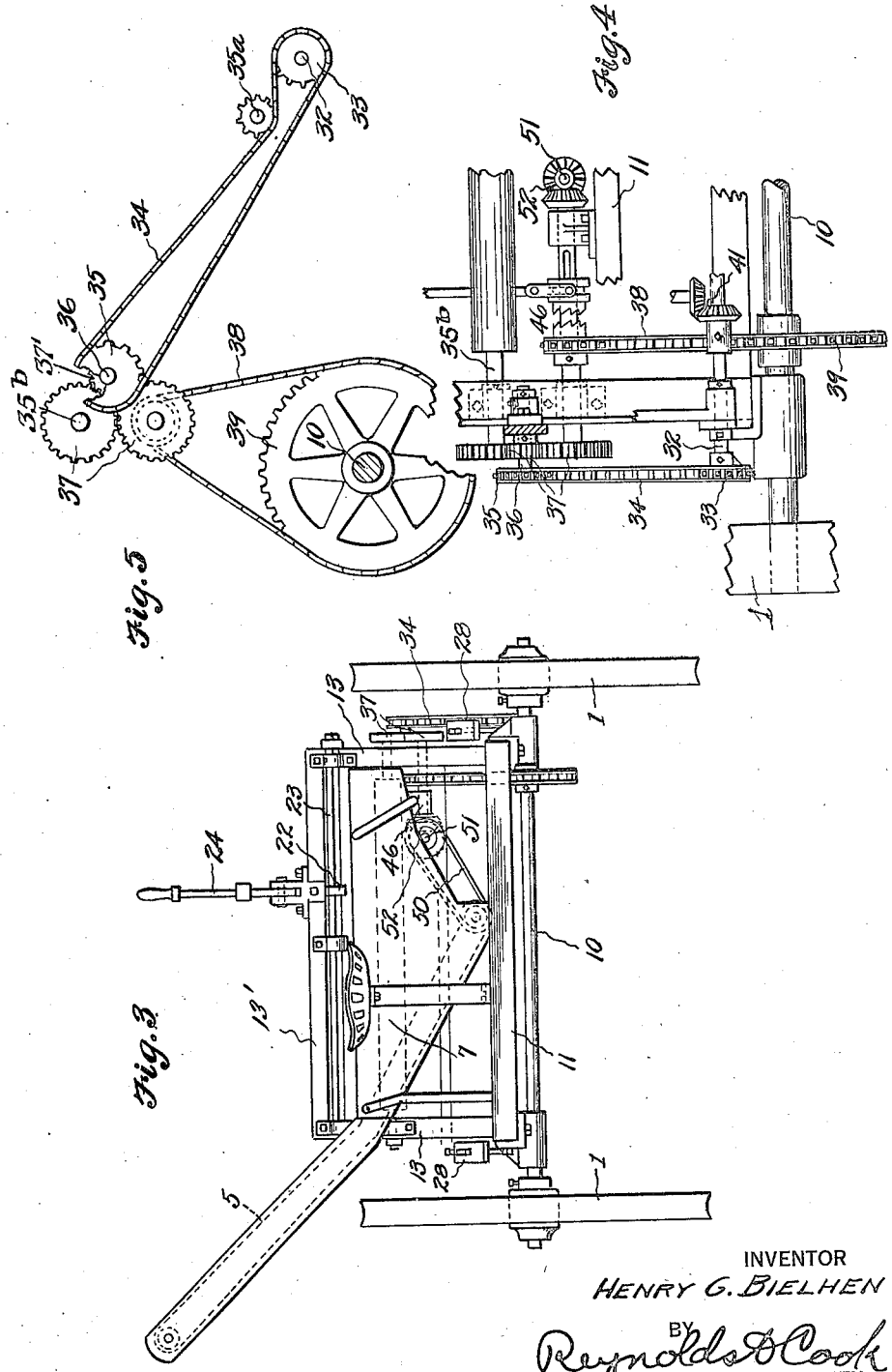

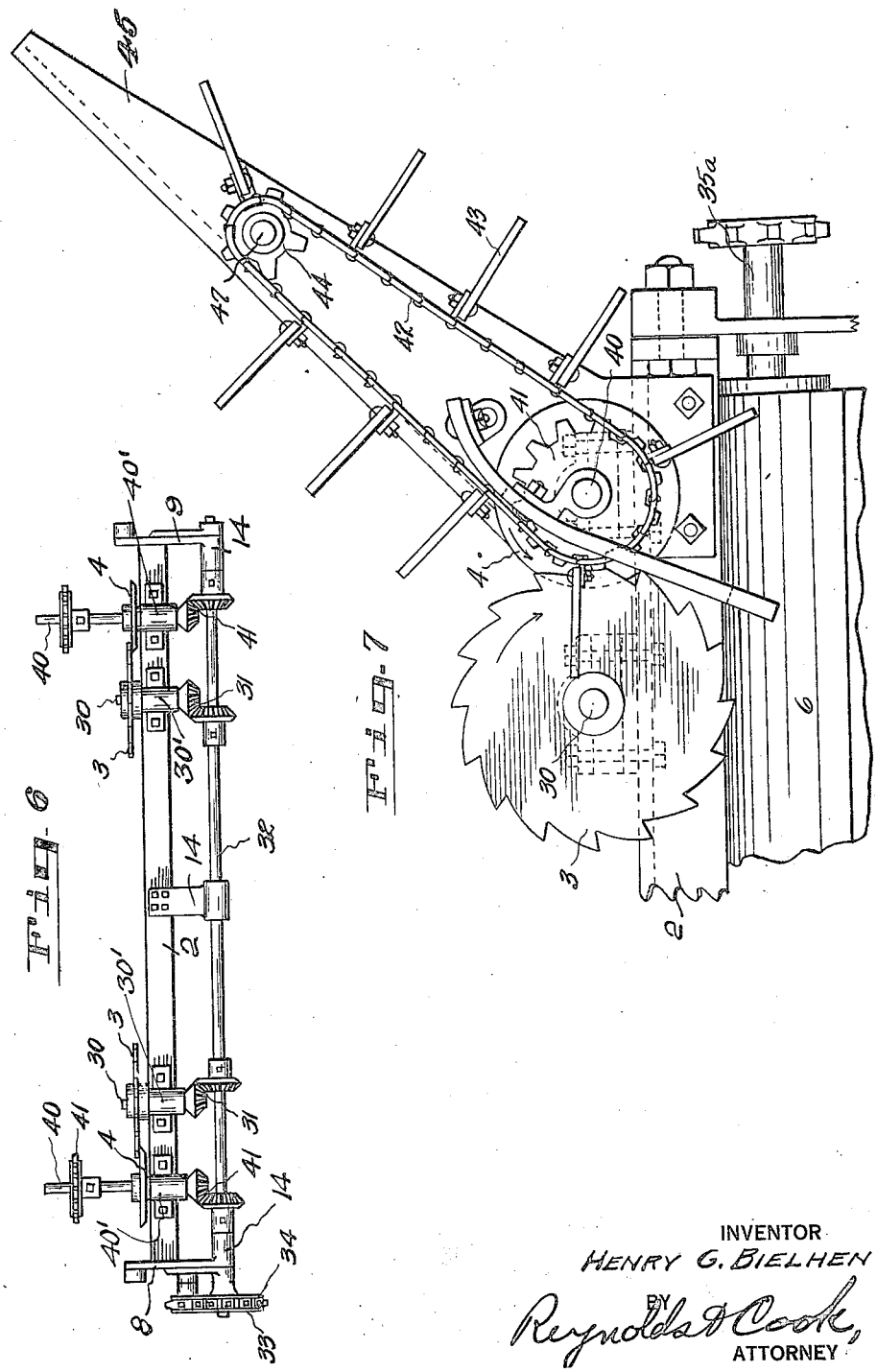

Patented Feb. 13, 1923.

1,445,383

UNITED STATES PATENT OFFICE.

HENRY G. BIELHEN, OF ST. JOSEPH, MISSOURI.

KAFIR-CORN HARVESTER.

Application filed October 29, 1919. Serial No. 334,236.

*To all whom it may concern:*

Be it known that I, HENRY G. BIELHEN, a citizen of the United States, and resident of the city of St. Joseph, county of Buchanan, and State of Missouri, have invented certain new and useful Improvements in Kafir-Corn Harvesters, of which the following is a specification.

My invention relates to grain harvesters, and more particularly to harvesters intended for cutting headed grains such as Kafir corn, sorghum, and other grains having like types of heads.

It is the object of the invention to provide a harvester which may be operated conveniently and which is capable of cutting the heads of such grains rapidly and without leaving a great amount of stalk upon the heads.

In accomplishing these and other objects, I have provided the improved details of construction, the preferred forms of which are illustrated in the accompanying drawings, wherein—

Figure 1 is a perspective view, showing my harvesting device as seen from the front and at one side.

Figure 2 is a side view of the harvester, the head cutting parts being shown in lowered position in full lines, and in raised position in dotted lines.

Figure 3 is a rear view of the machine.

Figure 4 is an elevation, as seen from the front, of the driving means for operating the principal parts of the machine.

Figure 5 is a side view of the driving mechanism for the principal parts.

Figure 6 shows the cutter driving mechanism in elevation as seen from directly in front of the machine.

Figure 7 is a top, plan view, of the head cutting mechanism at one side of the machine.

The common and substantially universal method of cutting Kafir corn, and other like headed grains, has been to cut the heads from the stalk by hand knives; the heads being then thrown into a wagon alongside. In the present invention is shown a machine whereby the heads may be cut by power and by power elevated and discharged into a wagon driven alongside.

The machine is mounted upon a wheeled vehicle and the power for operating the cutting mechanism is obtained from the wheel or axle of the vehicle. As the most desirable type of vehicle, I have illustrated one having two wheels, 1, mounted at the opposite ends of an axle 10 on which is mounted a horizontal base frame 11 provided with shafts 12 and means for hitching a horse thereto.

The frame may have any desired shape which will meet the needs of properly supporting and controlling the operating parts. As here shown, it has vertical posts 13 at opposite sides, upon which the chief operating members are supported and these are connected across their upper ends by an integral cross bar 13'. From this main frame is supported an adjustable frame upon which the head cutting members are carried and which comprises parallel bars 20 at each side, which, at their outer ends, are connected pivotally to the frame proper which consists of a horizontal cross bar 2 with vertical end pieces 8 and 9 fixed thereto, as shown in Figure 6, and provided with bearings 14 through which a rotatable cross shaft 32 extends.

The rearward ends of the lower bars 20 are pivotally supported upon the ends of a roller shaft 35$^b$ that extends between the frame posts 13, and the rearward ends of the upper bars 20 are fixed to the ends of transverse rock shaft 23 that is rotatively supported parallel with and above the shaft 35$^b$ from the posts 13. The frame 2 is adjusted to different vertical positions by movement of a lever 24 mounted upon the cross bar 13' and which is connected at its lower end by means of a link 21 with the end of a lever 22 that is fixed to the rock shaft 23. The lever 24 may be secured in adjusted positions by means of a locking dog or pawl 24' which engages with a segment bar 25 that is fixed to the frame.

To make the operation of the frame easy I prefer to connect a counter balance thereto so that the dead weight of the frame and the parts carried thereby will be overcome when the frame is raised. This counterbalance, as shown, employs a lever 26 that is pivotally supported between its ends from the frame 11 by means of a post 29. It is connected at its inner end by means of a link 27 with the upper frame supporting bar 20 at one side of the machine, and at its rearward end has a counterweight 28 adjustably mounted thereon.

One set of the stalk cutting members are shown in detail in Figure 7, and consist of a toothed and sharpened disk 3 and a complemental disk 4. The latter may be a smooth edged disk placed to overlap the toothed edge of the disk 3 and the two act to cut in the same manner as does a pair of shears.

As is best illustrated in Figure 6, the toothed disks 3 are mounted upon the upper ends of vertical shafts 30 that are secured to the frame 2 in bearings 30', and the disks 4 are fixed on vertical shafts 40 in bearings 40' that are also secured to the cross bar 2. These shafts when driven, are rotated to turn the paired disks in opposite directions, as is indicated by the arrows thereon in Figure 7, the means for driving being pairs of beveled gears 31 and 41 mounted upon the shafts 30 and 32, and shafts 40 and 32, respectively. The shaft 32 is driven through a sprocket wheel 33 at its end and a chain 34, which passes over a sprocket wheel 35 at one end of a stub shaft 36 fixed upon the lower bar 20 at that side of the machine. The shaft 36 is driven through a train of gears designated at 37 and these are driven through a chain 38 that passes over a sprocket wheel 39 carried by the axle 10 of the vehicle, one of the gears 37 being mounted on the end of the transverse shaft 35$^b$ and meshing with a smaller gear designated at 37' in Figure 5, that is fixed on the stub shaft 36 to drive the gear 35. The driving of these parts may be controlled through a clutch mechanism of a suitable character as designated at 46 in Figure 4.

In conjunction with each pair of cutters I employ a gathering device which includes a gathering arm 45 that is fixed to the cross bar 2 and extends forwardly and outwardly therefrom, and a gathering belt 42 which runs over sprocket wheels 41 and 44 that are mounted respectively upon the upper ends of the shafts 40 and vertical posts 47 that are fixed to the arms 45 near their outer ends. The gathering belts are equipped with fingers 43 for the purpose of moving the grain heads into the cutters. The heads when cut fall upon a rearwardly moving belt or apron 6 which travels over rollers carried by the transverse shaft 35$^b$ and 35$^a$ and this belt dumps the heads into a hopper 7 and upon transversely traveling conveyor and elevator belts 50 and 5, the latter having its discharge end extended about a roller at the upper end of an elevator extending at one side of the machine and at such an elevation that the heads when discharged may fall into a wagon driven alongside.

The gathering devices gather the heads of two rows, one at each side of the machine, and the heads are cut off and delivered by means of the belt conveyor into the hopper 7 and are then elevated and discharged at one side of the machine. By suitable manipulation of the lever 24 the rock shaft 23 may be rotated to thereby cause the cutting mechanism to be raised or lowered to accommodate corn of different height; this may also be done so as to accommodate for great variations occurring close together. In fact it is contemplated that the height adjusting lever shall be under the constant control of the operator.

What I claim as my invention is:—

1. In a harvester for Kafir corn and like headed grains, a wheeled vehicle frame comprising vertical standards at its opposite sides, an upper rotatably mounted rock shaft and a lower supporting shaft extended horizontally in the same vertical plane between said standards, a cutter supporting frame, a pair of vertically spaced, parallel supporting bars for each side of said cutter frame; said upper and lower bars of each pair having their forward ends pivotally fixed in vertical alinement to the said cutter frame and having their rearward ends respectively fixed to the rock shaft and rotatable on the lower supporting shaft, and an actuating means for the rock shaft.

2. In a harvester for Kafir corn and like headed grains, a wheeled vehicle frame comprising vertical standards at its opposite sides connected at their upper ends by a cross bar, an upper rotatably mounted rock shaft and a lower supporting shaft extended horizontally in the same vertical plane between said standards, a cutter supporting frame, a pair of vertically spaced, parallel supporting bars for each side of said cutter frame; said upper and lower bars of each pair having their forward ends pivotally fixed in vertical alinement to the said cutter frame and having their rearward ends respectively fixed to the rock shaft and rotatable on the lower supporting shaft, a lever mounted upon the cross bar of said frame, and a crank arm fixed to the rock shaft and connected to the said lever, whereby adjustment of the latter will cause rotation of the rock shaft and vertical adjustment of the cutter frame.

Signed at Tacoma, Washington, this 20th day of October, 1919.

HENRY G. BIELHEN.